Sept. 29, 1936.   F. W. MANNING   2,055,870
REFINING OF LUBRICATING OILS IN INTERNAL COMBUSTION ENGINES
Original Filed Oct. 10, 1932
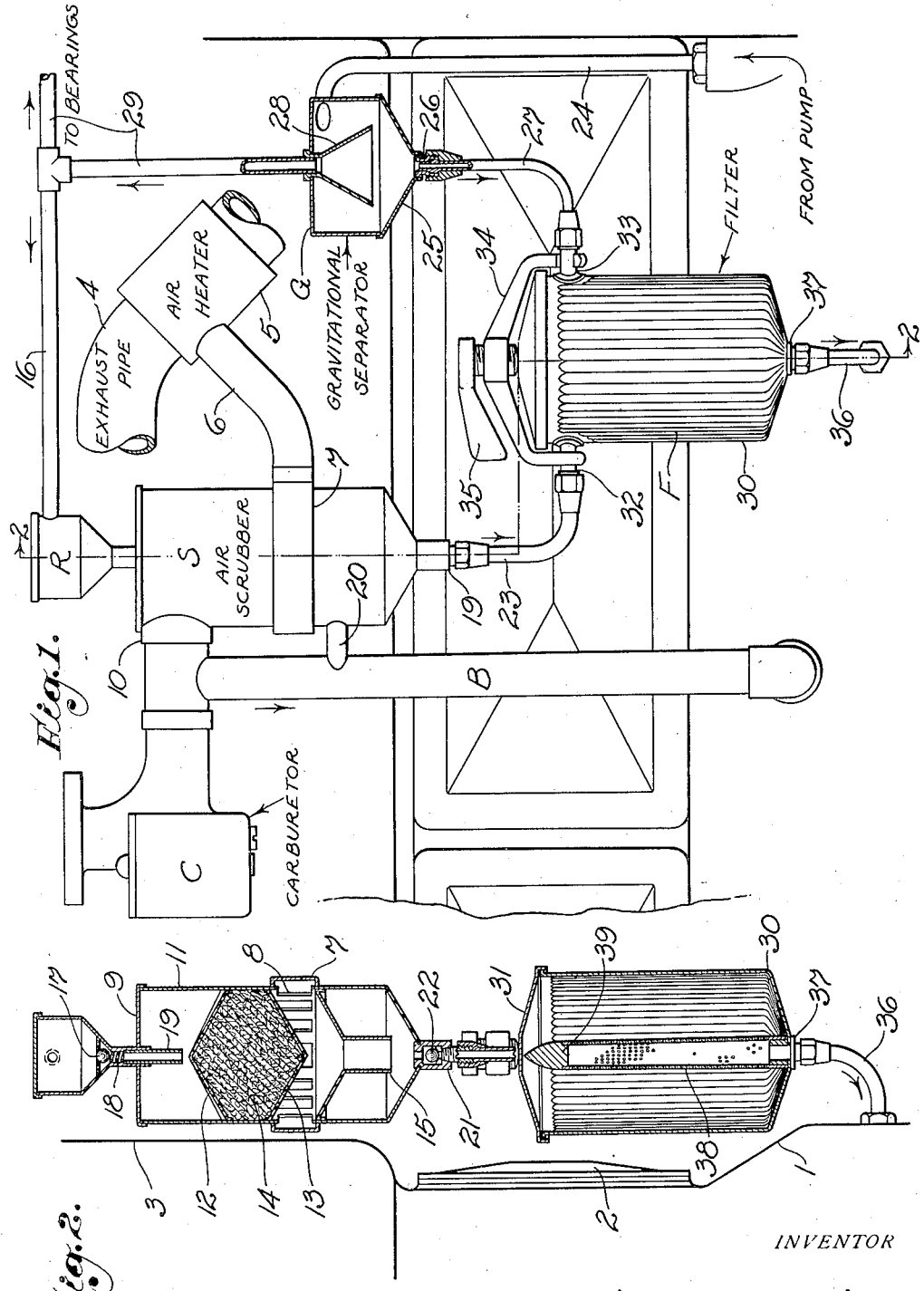
INVENTOR
Fred W. Manning Patented Sept. 29, 1936

2,055,870

UNITED STATES PATENT OFFICE 2,055,870

REFINING OF LUBRICATING OILS IN INTERNAL COMBUSTION ENGINES

Fred W. Manning, Pasadena, Calif., assignor to F. W. Manning Co., Ltd., Los Angeles, Calif., a corporation of California Application October 10, 1932, Serial No. 636,990
Renewed November 5, 1935

8 Claims. (Cl. 123—196)

This invention relates to filters, and is more particularly directed to improved filtering devices for keeping the lubricating oil of internal combustion engines in a state in which it is substantially free from all foreign contaminations. These contaminations result mostly from dust entrained in the air required for combustion and breathing purposes, carbon resulting from the decomposition of the oil in the cylinders, metal particles from the bearings, water formed as a product of combustion, and fuel oil escaping past the piston rings.

In accordance with my invention, I remove the dust from the air before it enters the carburetor, or crankcase through the breather, by passing it through a scrubber where it comes in contact with a quantity of oil in finely divided state, moving in a counter direction. The oil carries the fine dust particles removed from the air into an oil filter where they are retained with other solid contaminations such as the carbon and metal particles removed from the lubricating oil. The dispersing and movement of the oil in a finely divided state through the scrubber, and the passage of the air in counter direction, also causes the vaporization of the liquid contaminations such as water and fuel oil, which vapors are entrained with the air and carried into the carburetor, and this action may be hastened by heating the air before it enters the scrubber as by passing it around the exhaust manifold. The oil required for scrubbing purposes may be charged into the scrubbing chamber automatically when starting up the engine through the operation of a plunger attached to the choke rod, or pump on the starter shaft, and upon stoppage of the engine may flow by gravity from the sump of the scrubber into and through the filter and down into the crankcase; or a portion of the oil required for oiling the chassis may be charged into the scrubber simultaneously with the movement of the oil through the chassis lubricating system, and upon stoppage of the engine flow by gravity into and through the filter and then be added to the lubricating oil in the crankcase; or a portion of the lubricating oil may be passed into a receiver, which automatically closes when full and upon stoppage of the engine empties itself into the scrubbing chamber through which and the filter it flows by gravity down into the crankcase.

The filter may be charged with a pseudo-gel or pressure mobile suspension comprising a mixture of crankcase oil and suitable fibres such as is described in my copending application entitled "Filtering compositions", Serial No. 738,789, filed August 7, 1934. The fibres may be cellulose, asbestos or what is commonly called slag wool, or a mixture of them, and with the fibres may be mixed a decolorizing or other treating agent. As the filter is placed on a by-pass line of the lubricating system, a gravitational separator is provided on the main line to remove by sedimentation all of the heaviest and most abrasive solid particles from the oil before any of it reaches the bearings, and these solid particles are carried out of the separator through the by-pass line to the filter and the filtered oil returned to the main stream. In this way all of the most abrasive particles are removed at once from the main stream of oil as it is pumped to the bearings, and the finer particles are removed from a by-passed stream, ultimately resulting in all solid impurities being removed from the system. Darkening of the oil by fine carbon particles indicates that the fibres are becoming exhausted and should soon be replaced by fresh fibres.

The invention is exemplified in the following description, and one form of apparatus for carrying out the process is illustrated by way of example in the following drawing, in which:

Figure 1 is a side elevation of a portion of an internal combustion engine showing the relative positions of filter, air scrubber, and gravitational separator.

Fig. 2 is a vertical section of the filter and air scrubber taken on line 2—2 of Fig. 1.

Referring more specifically to the drawing by reference characters: Figures 1 and 2 show the crankcase casting 1 and cover plate 2, and above the crankcase casting is the cylinder block 3. The exhaust manifold 4 is surrounded by a stove or air heater 5, connected by means of pipe 6 to the manifold 7, which surrounds the air intake openings 8 in the scrubber and vaporizer S.

The scrubber S consists of top cover plate 9, air outlet 10 connected to the breather B and the carburetor C, shell 11, upper radially corrugated perforated distributing cone 12, lower perforated cone 13, kinked wire 14, and the depending boot 15. Oil used as a scrubbing fluid is discharged from a by-pass line 16 on the main oil feed line, into the receiver R; and upon stoppage of the engine, flows by gravity past the ball check valve 17 which is held in open position by spring 18 when relieved of the oil pressure in the lubricating system, and through line 19 into the scrubber. If the starting and stopping of the engine is very frequent, the oil may be flushed through the scrubber more rapidly than it can be filtered, in which case the excess will overflow from the settling chamber in the bottom of the scrubber through pipe connection 20 and return to the crankcase through breather B. A check valve fitting 21 containing valve 22, permits discharge of the contents of the settling chamber through pipe line 23 to within the filter F, when the engine is not operating and no oil pressure exists within the filter.

A gravitational separator G is situated in the main lubricating feed line running from the pump in the crankcase, the line 24 from the pump being connected tangentially to the top of G. The latter, which is of comparatively large diameter in regard to its height, has a conical bottom 25 with an outlet fitting 26 to which is connected a comparatively small diameter by-pass line 27 leading to the filter F; and a central conical top outlet 28 which is connected to the main oil feed line 29 leading to the bearings.

The filter F comprises a shell 30, the sides of which are corrugated longitudinally, and the bottom radially, a cover 31 which may also be radially crimped, and the filter element. The two oil inlets 32 and 33, to which are connected the lines from the air scrubber and gravitational separator respectively, form the trunnion bearings for the filter if the latter is to be turned over for dumping purposes. The saddle clamp consists of a yoke 34 and a clamp screw 35. The filtrate oil line 36 leading to the crankcase, is connected to an outlet fitting 37 which is attached to the bottom of the shell, and over this fitting on the inside of the container is slipped the perforated tapered thimble 38, in whose upper end is a pointed closure piece 39. The crimps or corrugations in the shell will permit the necessary initial oil circulation around a fibre bag filter element, and this clearance will be increased by the consolidation of the fibres during use.

The operation of the apparatus has been in part indicated in connection with the foregoing description. During operation of the engine, the pump in the crankcase for the lubricating system discharges the main flow of oil through line 24 into the gravitational separator G. As the oil enters the upper portion of G in a tangential direction and at considerable speed, its swirling action carries the heavier and most abrasive solid particles toward, and distributes them around, the perimeter of the shell where the upward vortical flow of the greater portion of the oil through cone 28 into the main lubricating line 29 will affect them least. Sedimentation in conjunction with the downward flow over and out of the conical bottom 25 of the portion of the oil being by-passed, will carry these particles into the filter.

A portion of the oil from the main lubricating line 29 is by-passed through line 16 to the receiver R situated above the air scrubber S. The pressure of the oil, as soon as the receiver is full, will cause the ball valve 17 to become and remain seated until the engine stops, upon which the pressure being released, the spring 18 will lift the valve and allow the oil to escape into the scrubber. Conical crimped perforated plate 12 will disperse and distribute the oil so as to cause the kinked wire to be thoroughly wetted during the passage therethrough. This charging of the oil through the scrubber carries with it the road dust deposited on the wetted kinked wire by the upward passage of the air during a previous operation of the engine. During inoperation of the engine the oil will pass valve 22 and continue to flow down line 23 into the filter and percolate through its mass of fibres and into the crankcase until both receiver and sump of the scrubber are empty; and in similar manner, will the contents of the gravitational separator be discharged into and through the filter.

The cooperative actions of gravitational separator, air scrubber, and filter, as just described, will quickly remove all solid and liquid contaminations from a badly contaminated oil and give it the clarity of new oil. As soon as the oil begins to lose this clarity due to carbon particles accumulating, it will be evident that the fibrous filtering element is becoming thoroughly impregnated throughout its depth with solid impurities and should be replaced by fresh fibres. This can be accomplished by releasing the thumb lever of the clamp screw 35, detaching the yoke 34 from its oil inlet holding pins, and upon raising of the cover 31, a container of exhausted fibres can be lifted out and replaced by a container of fresh fibres.

I claim as my invention:

1. In combination with an internal combustion engine having a lubricating system, an air scrubbing chamber having an air inlet and an air outlet, an air scrubber between the said inlet and outlet, connections from the outlet to the carburetor of the engine, an oil filter having connections to the said chamber and the said lubricating system; means for passing air through the scrubber and into the carburetor, and means controlled by the starting and stopping of the engine for causing a predetermined amount of oil to be passed through the scrubber and filter and added to the lubricating system whereby solid contaminations removed from the air in the scrubber are removed from the scrubber and deposited in the filter.

2. In combination with an internal combustion engine having a lubricating system, an air scrubbing chamber having an air inlet and an air outlet, an air scrubber between the said inlet and outlet, connections from the outlet to the carburetor of the engine, an oil filter having connections to the said chamber and the said lubricating system, means for passing air through the scrubber and into the carburetor, and means controlled by the starting and stopping of the engine for causing a predetermined amount of oil from the lubricating system to be passed through the scrubber in counter direction to the movement of the air, through the filter and returned to the lubricating system, whereby solid contaminations removed from the air in the scrubber are removed from the scrubber and deposited in the filter.

3. In combination with an internal combustion engine having a lubricating system, an oil filter operating under pressure of the lubricating system during operation of the engine, an air scrubbing chamber having an air inlet and an air outlet, connections from the outlet to the carburetor of the engine, an air scrubber in the chamber between said inlet and outlet, means for passing air through the scrubber into the carburetor, and means for feeding oil from the lubricating system through the scrubber into the filter.

4. In combination with an internal combustion engine having a lubricating system, an oil filter operating under pressure of the lubricating system during operation of the engine, an air scrubbing and oil vaporizing chamber having an air inlet and an air outlet, connections from the outlet to the carburetor of the engine, an air scrubber in the chamber between the said inlet and outlet, means for passing air through the scrubber into the carburetor, and means for discharging oil from the lubricating system through the scrubber into the filter whereby liquid contaminations are removed from the oil and carried with the air into the carburetor and solid contaminations are removed from the air and carried with the oil into the filter.

5. In combination with an internal combustion engine having a lubricating system, an air scrubbing and oil vaporizing chamber having an air outlet and an air inlet, connections from the outlet to the carburetor of the engine, an air scrubber in the chamber between the said inlet and outlet, an oil filter having connections to the said chamber and the lubricating system and operating under pressure of the lubricating system during operation of the engine, means for passing air through the scrubber in one direction and oil from the lubricating system through the scrubber in another direction whereby liquid contaminations are removed from the oil and carried with the air into the carburetor and solid contaminations are removed from the air and carried with the oil into the filter, and means for returning the filtered oil to the lubricating system of the engine.

6. In combination with an internal combustion engine having a lubricating system, an air scrubbing and oil vaporizing chamber having an air inlet and an air outlet, connections from the outlet to the carburetor of the engine, an air scrubber between the said inlet and outlet, an oil filter having connections to the said chamber and the lubricating system and operating under pressure of the lubricating system during operation of the engine, means for passing the air and oil through the scrubber in contact with one another whereby the liquid contaminations are removed form the oil and carried with the air into the carburetor and solid contaminations are removed from the air and carried with the oil into the filter, and means for returning the filtered oil to the lubricating system of the engine.

7. In combination with an internal combustion engine having a lubricating system, an air scrubbing chamber having an air inlet and an air outlet, an air scrubber between the said inlet and outlet, connections from the outlet to the carburetor of the engine, an oil filter having connections to the said chamber and the said lubricating system and operating under pressure of the lubricating system during operation of the engine, means for passing air and oil through the scrubber in contact with one another whereby solid contaminations are removed from the air and carried with the oil into the filter, and means for returning the filtered oil to the lubricating system of the engine.

8. In combination with an internal combustion engine having a lubricating system, an air scrubbing and oil vaporizing chamber having an air inlet and an air outlet, connections from the inlet to an air heating means and from the outlet to the carburetor of the engine, a scrubber in the chamber between the said inlet and outlet, an oil filter having connections to the said chamber and the lubricating system and operating under the pressure of the lubricating system during operation of the engine, means for conducting hot air from the said heating means and passing it and oil from the lubricating system through the said chamber in contact with one another whereby the liquid contaminations are removed from the oil and carried with the air into the carburetor and the solid contaminations are removed from the air and carried with the oil into the filter, and means for returning the filtered oil to the lubricating system of the engine.

FRED W. MANNING.